United States Patent
Gardner et al.

[11] 3,897,718
[45] Aug. 5, 1975

[54] WALL MEANS FOR A SERVOMOTOR

[75] Inventors: Delbert J. Gardner; Maxwell L. Cripe, both of South Bend, Ind.

[73] Assignee: The Bendix Corporation, South Bend, Ind.

[22] Filed: July 30, 1973

[21] Appl. No.: 383,931

[52] U.S. Cl. ............... 91/411 A; 91/376; 92/48; 92/99; 92/100
[51] Int. Cl. ...... F01b 19/00; F15b 13/06; F16j 3/02
[58] Field of Search .. 91/376 R, 369, 369 A, 369 B, 91/411 A, 97; 92/48, 49, 99, 100

[56] References Cited
UNITED STATES PATENTS

| | | | |
|---|---|---|---|
| 2,415,035 | 1/1947 | Penrose | 91/376 X |
| 2,733,572 | 2/1956 | Butterfield et al. | 92/99 X |
| 3,023,053 | 2/1962 | Hager | 91/369 A |
| 3,096,689 | 7/1963 | Kytta | 92/99 X |
| 3,152,518 | 10/1964 | Ayers, Jr. | 92/99 X |
| 3,292,502 | 12/1966 | Myers et al. | 91/376 X |
| 3,321,916 | 5/1967 | Cripe | 91/376 X |
| 3,350,882 | 11/1967 | Leising | 91/369 X |
| 3,552,272 | 1/1971 | Parsons | 91/376 X |

*Primary Examiner*—Irwin C. Cohen
*Attorney, Agent, or Firm*—Leo H. McCormick, Jr.; William N. Antonis

[57] ABSTRACT

A movable wall assembly for use in a servomotor having a resilient diaphragm with a bead radially compressed in a groove on a hub by a backing plate to form a seal between a vacuum chamber and a power chamber. The diaphragm correspondingly axially urges the wall assembly into contact with the hub to prevent relative movement therebetween.

1 Claim, 8 Drawing Figures

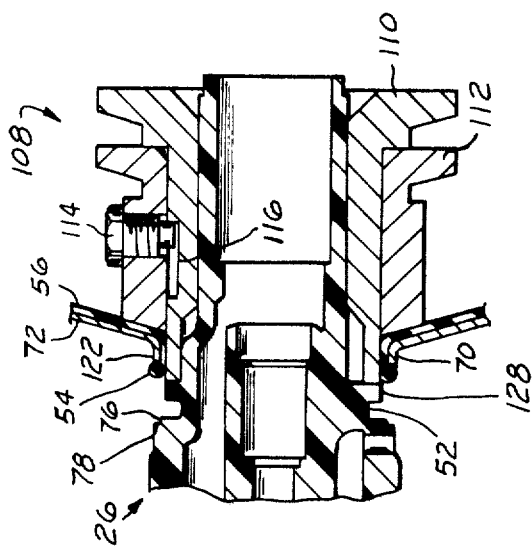
FIG. 4-C
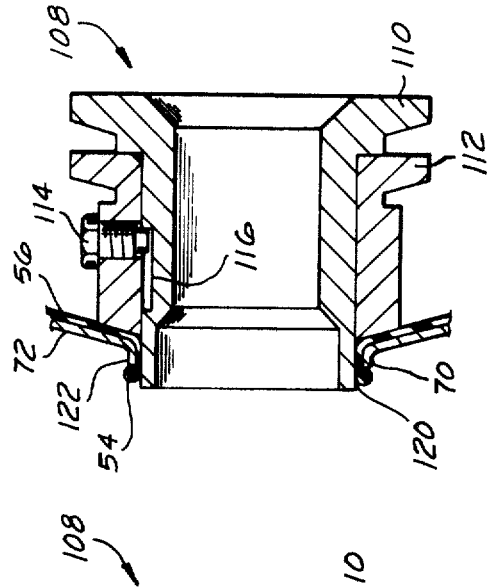
FIG. 4-B
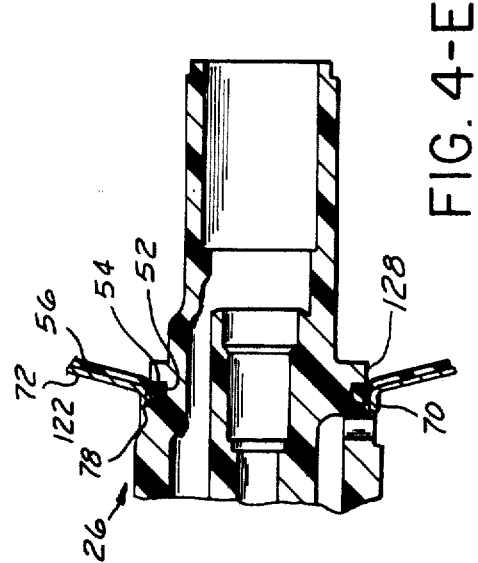
FIG. 4-E
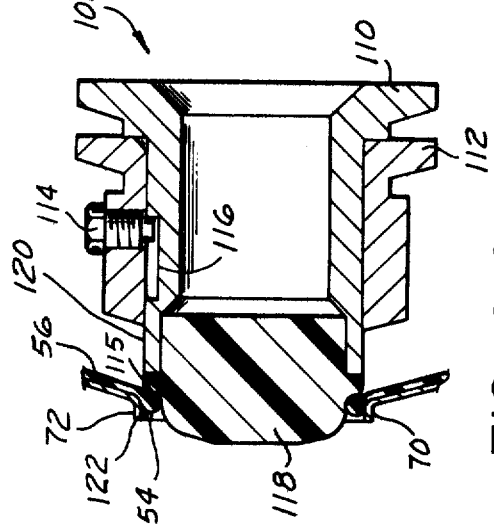
FIG. 4-A
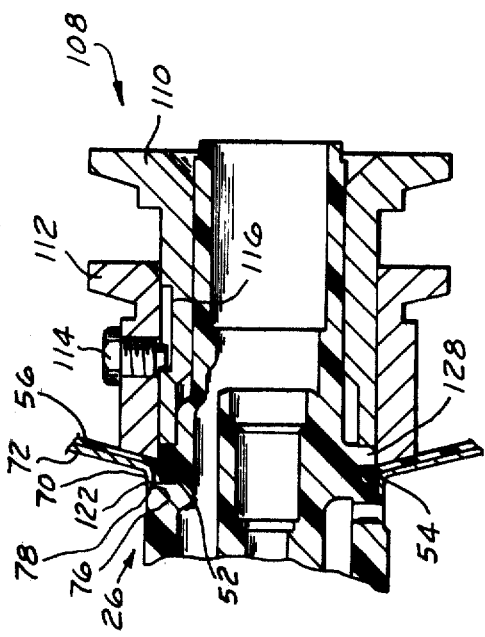
FIG. 4-D

WALL MEANS FOR A SERVOMOTOR

BACKGROUND OF THE INVENTION

The movable wall means in conventional tandem servomotors are normally constructed of two parts, namely a metal diaphragm plate and a rubber diaphragm, which are joined together by a series of bolts or interlocking threads on the mated parts. This type of arrangement is utilized because such parts are easily stamped or molded. In an effort to reduce the overall cost of such servomotors a uniform size hub for holding an operational control valve, as described in U.S. patent application Ser. No. 184,773, filed Sept. 29, 1971, and now U.S. Pat. No. 3,754,450 was developed to accommodate variable sized backing plates. The backing plate used in this servomotor is resiliently held against the hub by the diaphragm.

SUMMARY OF THE INVENTION

We have devised a servomotor wherein the wall means has a backing plate with a sleeve extending from the end thereof to radially compress the diaphragm in a groove in a hub containing the control valve for the servomotor. The sleeve will axially locate the backing plate on the hub to uniformly transmit a substantially axially operational force to the hub means.

It is therefore the object of this invention to provide a servomotor with a wall means having a backing plate for providing a radial compressive force to seal a bead on a diaphragm in a groove on a hub containing a valve means.

It is another object of this invention to provide a wall means with a backing plate having a sleeve attached to the end thereof for transmitting an axial force to a reaction member in response to a pressure differential created by an input force.

It is still a further object of this invention to provide a wall means with a backing plate for radially compressing a diaphragm bead in a groove on a hub while the diaphragm urges the backing plate against a shoulder on the hub to prevent relative motion therebetween.

These and other objects will become apparent from reading this specification and viewing the drawing.

BRIEF DESCRIPTION OF THE PREFERRED EMBODIMENT

Figure 1:
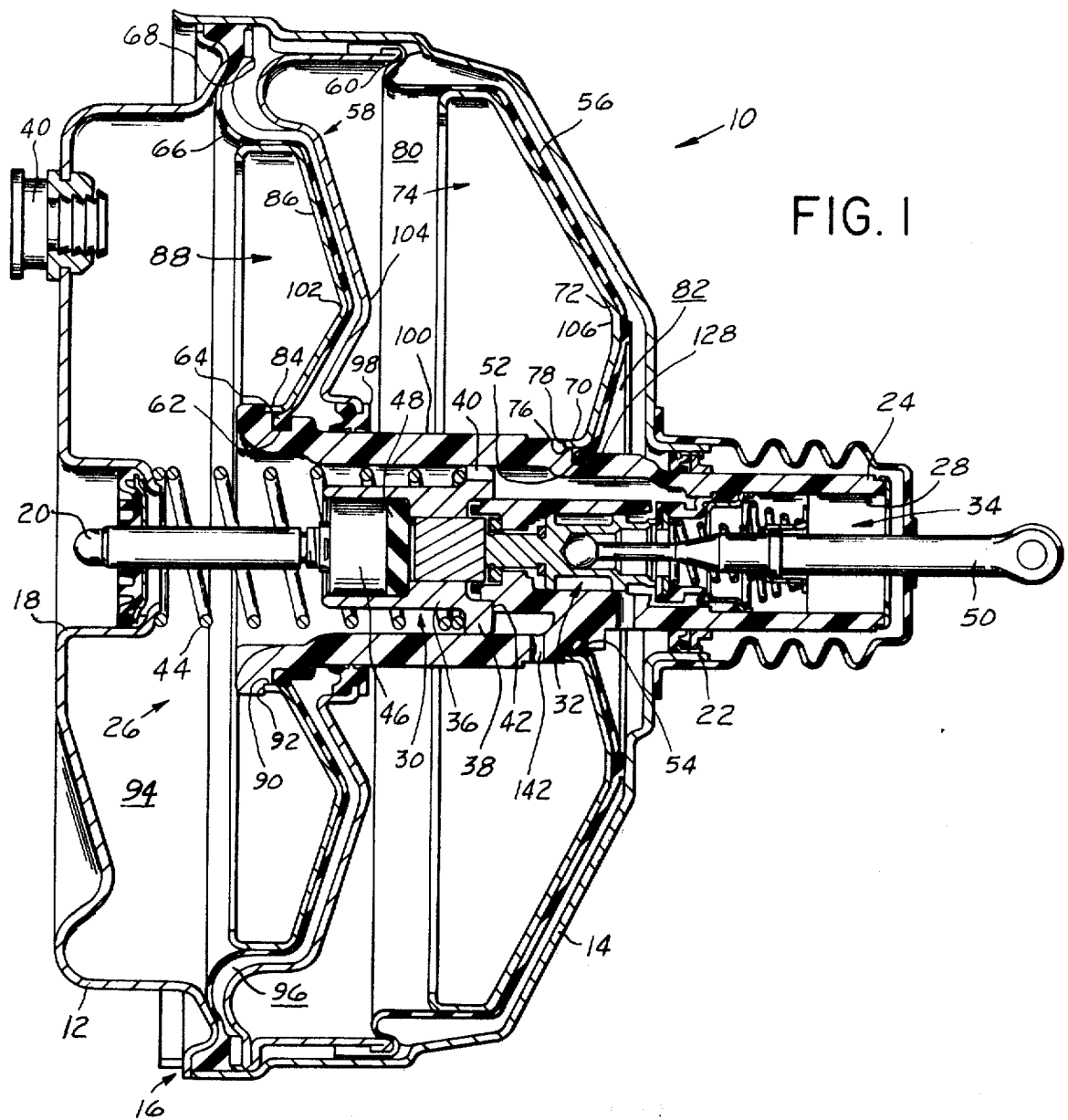
FIG. 1 is a sectional view of a servomotor having a wall means wherein a backing plate compresses a diaphragm in a groove while the diaphragm urges the backing plate against a shoulder on the hub to reduce the possibility of relative motion therebetween.

FIGS. 4-A, 4-B, 4-C, 4-D and 4-E are sequential methods of assembling the wall means on the hub in FIG. 1.

DETAILED DESCRIPTION OF THE PREFERRED EMBODIMENT

The servomotor 10 shown in FIG. 1 has a front shell 12 joined to a rear shell 14 through a twist lock means 16 to form a cavity within the housing. The front shell has an axial opening 18 through which a push rod 20 extends to supply a master cylinder (not shown) with an operative force in response to an input force. The rear shell 14 has an axial opening 22 through which a continuous cylindrical body 24 of the hub means 26 extends.

The hub means 26 has a stepped internal bore 28 into which a reaction means 30, plunger means 32, and valve means 34 are sequentially located. The plunger means 32 and control valve means 34 are known and adequately described in U.S. patent application Ser. No. 184,773, filed Sept. 29, 1971, and now U.S. Pat. No. 3,754,450 incorporated herein by reference. The reaction means 30 includes a tubular member 36 with a flange 38 which is located in the stepped bore 28. The flange 38 has a series of axial openings 40 to permit communication from a source of vacuum connected to the check valve 40 to the control valve means 34. The flange 38 is held in abutting engagement with stop 42 by the return spring 44 which is partially located within the stepped bore 28. The reaction means 30 holds the head 46 and the push rod 20 in axial alignment with a reaction disc 48 to prevent any adverse sideway force from affecting the input force transmitted through the input push rod 50 to the control valve means 34.

The hub means 26 has a continuous cylindrical body which has a first groove 52, for locating a bead 54 of the diaphragm 56 which is secured between the rear shell 14 and the end 60 of a partition means 58, and a second groove 62 for locating a bead 64 of the diaphragm 66 which is secured between the front shell 12 and front edge 68 of the partition means 58.

The first bead 54 is retained in groove 52 by a sleeve 70 attached to the backing plate 72 of a first wall means 74. The sleeve 70 is located on a ledge 76 and held against a shoulder 78 by the diaphragm 56 while radially compressing the bead 54 in groove 52 to form a fluid seal between a first vacuum chamber 80 and a first power chamber 82.

The second bead 64 is retained in groove 62 by a sleeve 84 attached to the backing plate 86 of a second wall means 88. The sleeve 84 is located on a ledge 90 and held against a shoulder 92 by the diaphragm 66 while radially compressing the bead 64 into groove 62 to form a fluid seal between the vacuum chamber 94 and the power chamber 96.

The partition means 58 which divides the cavity of the housing into substantially equal volumetric chambers has a seal 98 which slides on the cylindrical surface 100 between the shoulder 78 and the second groove 62. The partition means 58 has an annular rib 104 which is substantially concentric to rib 102 in backing plate 86 and rib 106 in backing plate 72. The ribs 102 and 106 will break up the moment through which the force created by the pressure differential between the respective vacuum chamber and the power chamber is transmitted through the sleeves 70 and 84. This will allow the actuation force to be substantially axial to the hub means 26.

MODE OF ASSEMBLING THE WALL MEANS IN THE SERVOMOTOR

FIGS. 4-A through 4-E illustrate the steps which are required to assemble the wall means 74 and 88 on the hub means 26. The wall means 88 is first placed on the hub means 26 after which the assembly mechanism 108 is moved to the rear to place the second wall means 74 thereon.

The assembly mechanism 108 includes a first tubular member 110 which has a concentric tubular member 112 located on the external periphery thereon. A bolt 114 secured to the tubular member 112 extends into a slot 116 in tublular member 110 to limit the relative movement thereto in the axial direction. A guide 118 is inserted into the tubular member 110. Since both wall means 74 and 88 are constructed identically only one will be described and the following will identify the elements in wall means 74. Bead 54 is brought into contact with a shoulder 115 on guide 118; see FIG. 4-A. The backing plate 72 is brought into contact with the diaphragm 56 and a force applied thereto causing the backing plate 72 to move onto the external surface 120 of the tubular member 110 with the bead 54 following the trailing edge 122 of the sleeve 70; see FIG. 4-B. The guide 118 is then removed and the hub means 26 inserted into the tubular member 110 until the periphery of the cylindrical body 128 adjacent the groove 52 abuts the end of the tubular member 110; see FIG. 4-C. A force is exerted on the tubular member 112 which moves the bead 54 in front of the end 122 of the sleeve 70. Upon tubular member 112 moving the bead 54 past the surface 128 on the periphery of the hub means 26 it will snap into the groove 52 to permit the sleeve 70 to move on to ledge 76 and into engagement with shoulder 78. The sleeve 70 has a width which is substantially equal to the ledge 76 and groove 52 to permit that portion of the diaphragm 56 adjacent the bead 54 to urge the end 122 against the shoulder; see FIG. 4-D. This will prevent relative movement between the sleeve on the backing plate 72 and the hub means 26. The hub means 26 is now removed from the tubular member 110, see FIG. 4-E, and inserted into the cavity of the servomotor 10.

MODE OF OPERATION OF THE PREFERRED EMBODIMENT

When the operator of a vehicle, wherein a servomotor 10 is installed, wants to develop an actuation force for operating a master cylinder (not shown), an input force is applied to push rod 50. This input force will move the control valve means 34 to interrupt the communication of vacuum from the front chamber 94 through the passage 142 and allow air to enter therethrough from bore 28. With air in the rear chambers 82 and 96, a pressure differential will be created across the wall means 74 and 88 to develop an actuation force which acts through the backing plates 72 and 86 to move the hub means 26 and supply the push rod 20 with an operational force.

Figure 2:
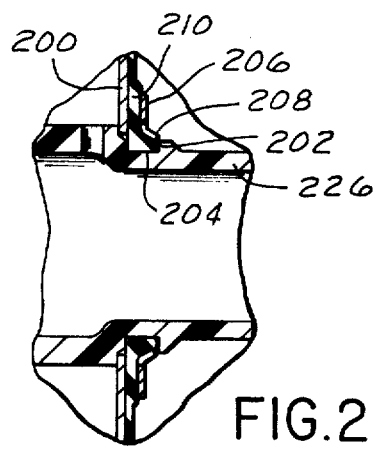
FIG. 2 is a sectional view of a seal between the wall means and a hub means.
Figure 3:
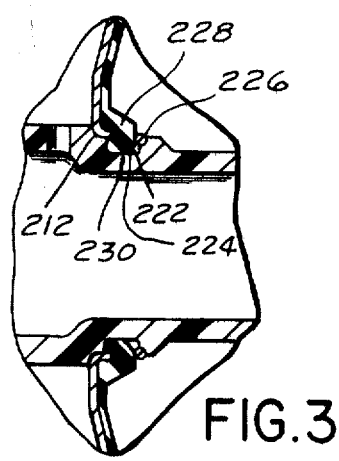
FIG. 3 is a sectional view of still another seal between a wall means and a hub means.

The embodiments shown in FIGS. 2 and 3 utilize the same principle taught in the embodiment of FIG. 1 wherein the backing plate 200 applies a compressive force to the bead or lip 202 and holds the same in the cylindrical body of the hub means 226.

In FIG. 2, a support 206 axially compresses the bead 202 into the backing plate 200. A series of fingers 208 compress the rear of the bead by being depressed into the groove 204 to positively fix the diaphragm 210 and backing plate 200, to hub means 226 to provide a fluid seal and prevent relative movement therebetween.

In FIG. 3, the sleeve 212 radially locates the bead 222 into the groove 224 while a secondary ring 226 holds the rear of the diaphragm 228 tight against the groove 230.

Thus, we have developed a servomotor 10 wherein a uniform hub means 26 can be utilized with varying sizes of shells 12 and 14 by changing the backing plate and the diaphragm to correspond to the size of the servomotor needed to operate the master cylinder.

We claim:
1. A servomotor comprising:
a housing having a front shell and a rear shell joined together to form a cavity therein;
hub means having a continuous cylindrical body which extends from the interior of said cavity through the rear shell, said cylindrical body having an external periphery with a first ledge located between a first shoulder and a first groove therein and a second ledge located between a second shoulder and a second groove, therein said cylindrical body having an axial bore therein;
control valve means located in said axial bore adjacent the rear shell for actuating the servomotor in response to an operator input;
reaction means located in said axial bore for transmitting an output force carried through the hub means to an output member;
partition means having an outer diameter connected to the housing and an inner diameter which surrounds the cylindrical body between the first shoulder and the second groove to divide the cavity into separate front and rear volumetric areas;
first diaphragm means having an outer diameter secured between the partition means and the rear shell and an inner diameter with a first bead located in the first groove to divide the rear volumetric area into a first vacuum chamber and a first power chamber;
first backing plate means abutting a major portion of said first diaphragm means having an outer diameter free to move in said rear volumetric area and an inner diameter with a first sleeve attached thereto and located on said first ledge, said first sleeve having a first face radially compressing the first bead into the first groove to seal the first vacuum chamber from the first power chamber, said first diaphragm means urging a second face of said first sleeve against the first shoulder of the hub means to prevent relative movement therebetween, said first backing plate means responding to a pressure differential created between the first vacuum chamber and the first power chamber upon actuation of said control means to transmit a first axial operational force through the first sleeve into said continuous cylindrical body;
second diaphragm means having an outer diameter secured between the partition means and the front shell and an inner diameter with a second bead located in the second groove to divide the front volumetric area into a second vacuum chamber and a second power chamber;
second backing plate means abutting a major portion of said second diaphragm means having an outer diameter free to move in the front volumetric area and an inner diameter with a second sleeve attached thereto and located on said second ledge, said second sleeve having a first face radially compressing the second bead into the second groove to seal the second vacuum chamber from the second power chamber, said second diaphragm means urging a second face of said second sleeve against the second shoulder of the hub means to prevent relative movement therebetween, said second backing plate means responding to a pressure differential created between the second vacuum chamber and the second power chamber upon actuation of said control means to transmit a second axial operational force through said second sleeve means into said continuous cylindrical body, said first and second axial operational forces being combined to produce said operational force; and resilient means having one end connected to the front shell and the other end guided by the interior of the cylindrical body into direct engagement with the reaction means for urging the hub means and associated first and second backing plate means and first and second diaphragm means toward the rear shell upon termination of an operator input.

* * * * *